(12) United States Patent
Pedersen et al.

(10) Patent No.: US 11,378,950 B2
(45) Date of Patent: Jul. 5, 2022

(54) REMOTE SYSTEM FOR AN AUTONOMOUS VEHICLE

(71) Applicants: NISSAN NORTH AMERICA, INC., Franklin, TN (US); United States of America as Represented by the Administrator of the National Aeronautics and Space Administration, Washington, DC (US)

(72) Inventors: Liam Pedersen, San Francisco, CA (US); Siddharth Thakur, Fremont, CA (US); Armelle Guerin, Portola Valley, CA (US); Ali Mortazavi, Walnut Creek, CA (US); Atsuhide Kobashi, Mountain View, CA (US); Mauro Della Penna, San Francisco, CA (US); Richard Enlow, Alameda, CA (US); Andrea Angquist, Los Altos Hills, CA (US); Richard Salloum, San Mateo, CA (US); Stephen Wu, Menlo Park, CA (US); Ben Christel, Palo Alto, CA (US); Shane Hogan, Arlington, MA (US); John Deniston, Colorado Springs, CO (US); Jen Hamon, Palo Alto, CA (US); Sannidhi Jalukar, Mountain View, CA (US); Maarten Sierhuis, San Francisco, CA (US); Eric Schafer, Kentfiel, CA (US); David Lees, Palo Alto, CA (US); Dawn Wheeler, Mountain View, CA (US); Mark Allan, Campbell, CA (US)

(73) Assignees: NISSAN NORTH AMERICA, INC., Franklin, TN (US); United States of America as Represented by the Admininstrator of the Nationa Aeronautics and Space, Washington, DC (US)

( * ) Notice: Subject to any disclaimer, the term of this patent is extended or adjusted under 35 U.S.C. 154(b) by 216 days.

(21) Appl. No.: 16/465,411

(22) PCT Filed: Dec. 22, 2017

(86) PCT No.: PCT/US2017/068260
§ 371 (c)(1),
(2) Date: May 30, 2019

(87) PCT Pub. No.: WO2018/119420
PCT Pub. Date: Jun. 28, 2018

(65) Prior Publication Data
US 2020/0004239 A1    Jan. 2, 2020

Related U.S. Application Data

(60) Provisional application No. 62/438,243, filed on Dec. 22, 2016.

(51) Int. Cl.
*G05D 1/00* (2006.01)
*G08G 1/00* (2006.01)
*G08G 1/01* (2006.01)

(52) U.S. Cl.
CPC ......... *G05D 1/0038* (2013.01); *G05D 1/0088* (2013.01); *G08G 1/0112* (2013.01); *G08G 1/0133* (2013.01); *G05D 2201/0213* (2013.01)

(58) Field of Classification Search
CPC .................................. G05D 1/00; G08G 1/01
See application file for complete search history.

(56) References Cited

U.S. PATENT DOCUMENTS

| | | | | |
|---|---|---|---|---|
| 2004/0073356 A1* | 4/2004 | Craine | ............. | G08G 1/096741 701/117 |
| 2005/0228578 A1* | 10/2005 | Burzio | ............. | G08G 1/096775 701/117 |

(Continued)

FOREIGN PATENT DOCUMENTS

| | | | |
|---|---|---|---|
| CN | 102568234 A | * | 7/2012 |
| JP | 2008044522 A | | 2/2008 |

(Continued)

OTHER PUBLICATIONS

Fleet manager "Is the Self-Driving Vehicle the Future of Fleets?"; 3 pages (Year: 2016).*

(Continued)

*Primary Examiner* — Kira Nguyen
(74) *Attorney, Agent, or Firm* — Global IP Counselors, LLP (57) ABSTRACT

A remote system for an autonomous vehicle, includes a receiver, a controller, and a display device. The receiver is (Continued)

configured to receive road information. The controller is programmed to receive input related to the road information and create a supervision zone when the road information impacts road drivability. The display device is disposed at a control center area and configured to display a visual indication on a map of the supervision zone.

9 Claims, 6 Drawing Sheets

(56) References Cited

U.S. PATENT DOCUMENTS

| | | | |
|---|---|---|---|
| 2008/0016545 A1* | 1/2008 | DeCinque | H04N 21/85403 |
| | | | 725/138 |
| 2012/0083959 A1 | 4/2012 | Dolgov et al. | |
| 2012/0083964 A1 | 4/2012 | Montemerlo et al. | |
| 2014/0088855 A1 | 3/2014 | Ferguson | |
| 2014/0335897 A1* | 11/2014 | Clem | G08G 1/147 |
| | | | 455/456.3 |
| 2015/0248131 A1 | 9/2015 | Fairfield et al. | |
| 2016/0095851 A1 | 4/2016 | Giovinazzo et al. | |
| 2016/0139594 A1 | 5/2016 | Okumura et al. | |
| 2016/0231746 A1 | 8/2016 | Hezelton et al. | |
| 2016/0334230 A1 | 11/2016 | Ross et al. | |
| 2017/0098373 A1* | 4/2017 | Filley | G08G 1/096708 |
| 2018/0051993 A1* | 2/2018 | Wagner | G08G 1/056 |
| 2018/0091439 A1* | 3/2018 | Zhang | G08G 1/0133 |

FOREIGN PATENT DOCUMENTS

| | | |
|---|---|---|
| JP | 2012129673 A | 7/2012 |
| JP | 2013544695 A | 12/2013 |
| WO | 2015156818 A1 | 10/2015 |

OTHER PUBLICATIONS

Extended Search Report in the corresponding European Patent Application No. 17883987.4 dated Dec. 3, 2019.

* cited by examiner

REMOTE SYSTEM FOR AN AUTONOMOUS VEHICLE

CROSS-REFERENCE TO RELATED APPLICATIONS

This application is a U.S. National Stage application of International Application No. PCT/US2017/068260, filed Dec. 22, 2017, which claims priority to U.S. Provisional Application No. 62/438,243, filed Dec. 22, 2016, the contents of each of which are hereby incorporated herein by reference.

BACKGROUND

Field of the Invention

The present invention generally relates to a remote system for an autonomous vehicle. More specifically, the present invention relates to a remote system for an autonomous vehicle when the autonomous vehicle encounters an issue that impacts road drivability.

Background Information

An autonomous vehicle can be controlled autonomously, without direct human intervention, to traverse a route of travel from an origin to a destination. An autonomous vehicle can include a control system that may generate and maintain the route of travel and may control the autonomous vehicle to traverse the route of travel.

SUMMARY

It has been discovered that autonomous vehicles can encounter a traffic situation that is counter to the programming of the vehicle. In such a situation, it may be advantageous to have a human operator intervene in the routing of the autonomous vehicle. In view of the state of the known technology, one aspect of the present invention is a remote system for an autonomous vehicle that includes a receiver, a controller, and a display device. The receiver is configured to receive road information. The controller is programmed to receive input related to the road information and create a supervision zone when the road information impacts road drivability. The display device is disposed at a control center area and configured to display a visual indication on a map of the supervision zone.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
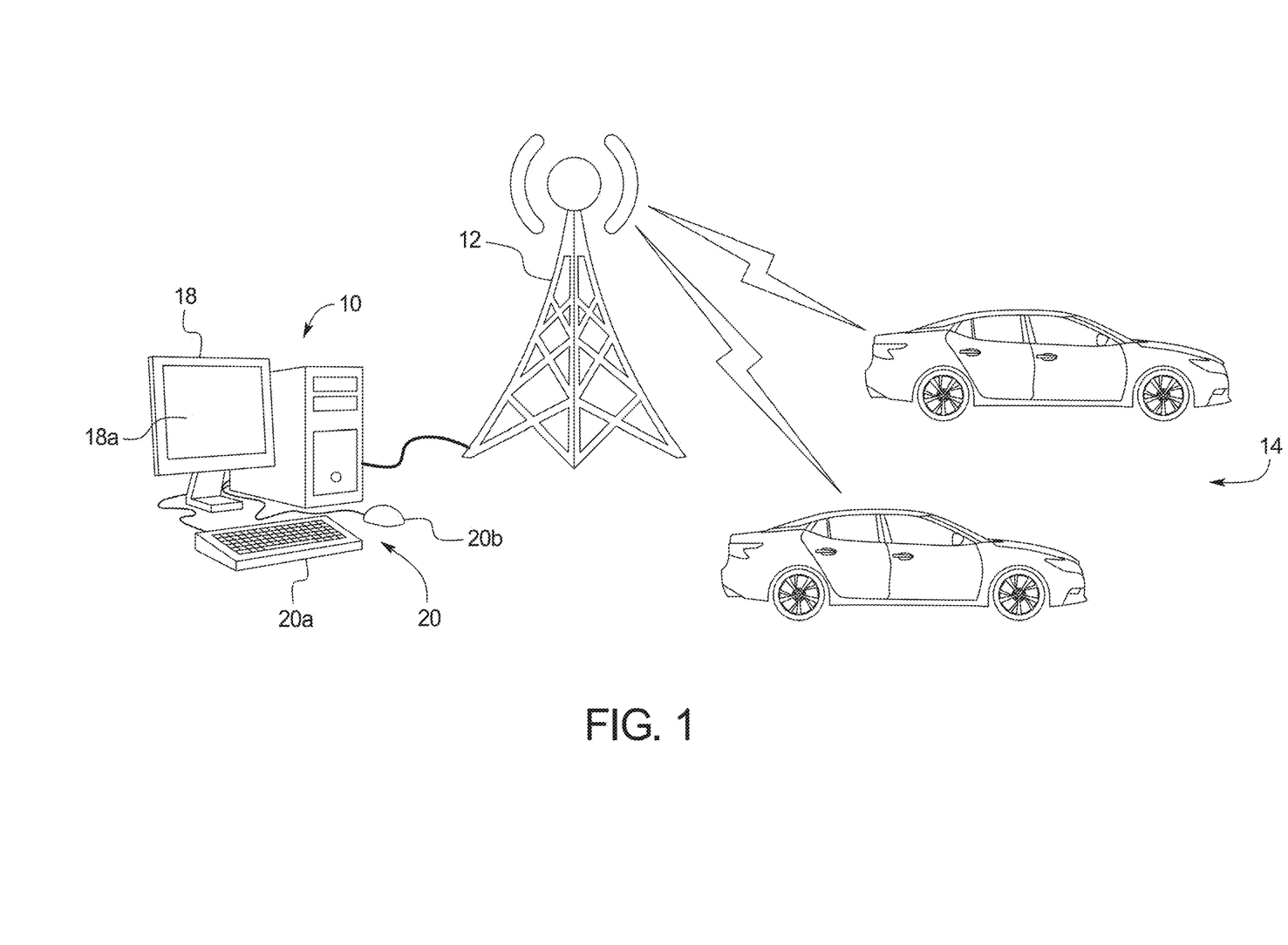
FIG. 1 is a schematic view of a plurality of autonomous vehicles communicating with an remote system for an autonomous vehicle.
Figure 2:
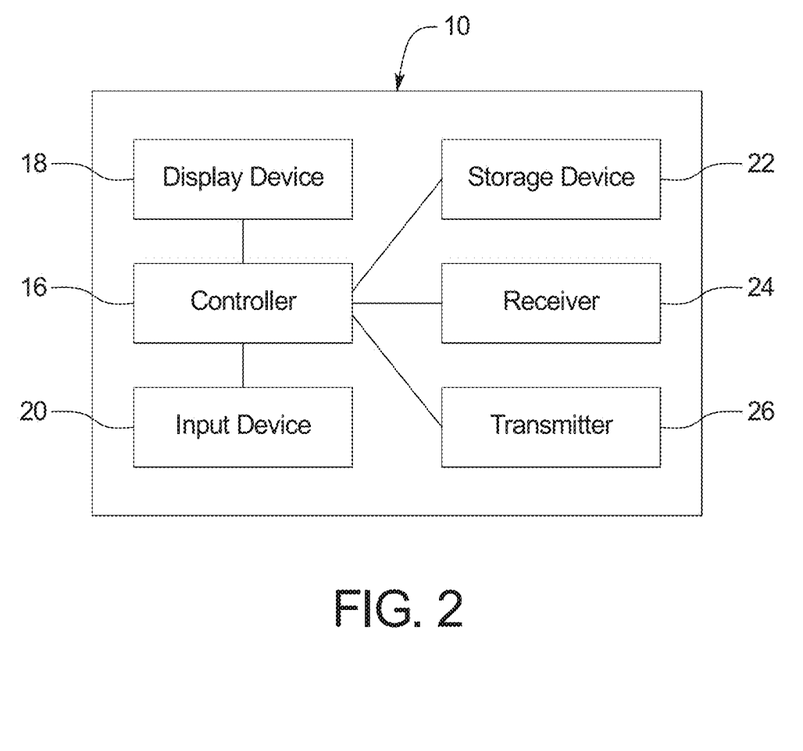
FIG. 2 is a schematic of the remote system for an autonomous vehicle.

Referring initially to FIGS. 1 and 2, a remote system for an autonomous vehicle 10 is illustrated in accordance with an embodiment. As shown in FIG. 1, the remote system for an autonomous vehicle 10 can be in communication (wired or wireless) with an antenna 12 that transmits and receives information to and from a plurality of autonomous vehicles 14. Accordingly, the remote system for an autonomous vehicle 10 can monitor the autonomous vehicles 14 to determine if there is a route issue, and update the autonomous vehicles 14 with information, including changes to the vehicle route.

As shown in FIG. 2, the remote system for an autonomous vehicle 10 can include a controller 16, a display device 18, an input device 20, a storage device 22, a receiver 24 and a transmitter 26.

The controller 16 preferably includes a microcomputer with a control program that controls the remote system for an autonomous vehicle 10 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control the remote system for an autonomous vehicle 10. The memory circuit stores processing results and control programs such as ones for display device 18 and transmitter 26 operation that are run by the processor circuit. The controller 16 is operatively coupled to the display device 18, the input device 20, the storage device 22, the receiver 24 and the transmitter 26 in a conventional manner. The internal RAM of the controller 16 stores statuses of operational flags and various control data. The controller 16 is capable of selectively controlling any of the components of the remote system for an autonomous vehicle 10 in accordance with the control program. It will be apparent to those skilled in the art from this disclosure that the precise structure and algorithms for the controller 16 can be any combination of hardware and software that will carry out the functions of the present invention.

The display device 18 can be any device capable of or configured to visual display date in any manner desired. For example, the display device 18 can be computer screen 18a as is known in the art. The input device 20 can be any suitable input device 20 that enables a user to input data or commands into the remote system for an autonomous vehicle 10. For example, the input device 20 can be a keyboard 20a, a mouse 20b, a microphone, or any other suitable device.

The receiver 24 and the transmitter 26 can be capable of receiving and transmitting data to and from the remote system for an autonomous vehicle 10. For example, the receiver 24 is capable of receiving information (data) from a plurality of autonomous vehicles 14 and communicating the received data to the controller 16, which in turn is capable of having information displayed on the display device 18. Additionally, the transmitter 26 is capable of having data input into the remote system for an autonomous vehicle 10 transmitted to one or a plurality of the autonomous vehicles 14.

The storage device 22 can be any type of storage device that enables data to be stored therein and retrieved therefrom.

Figure 3:
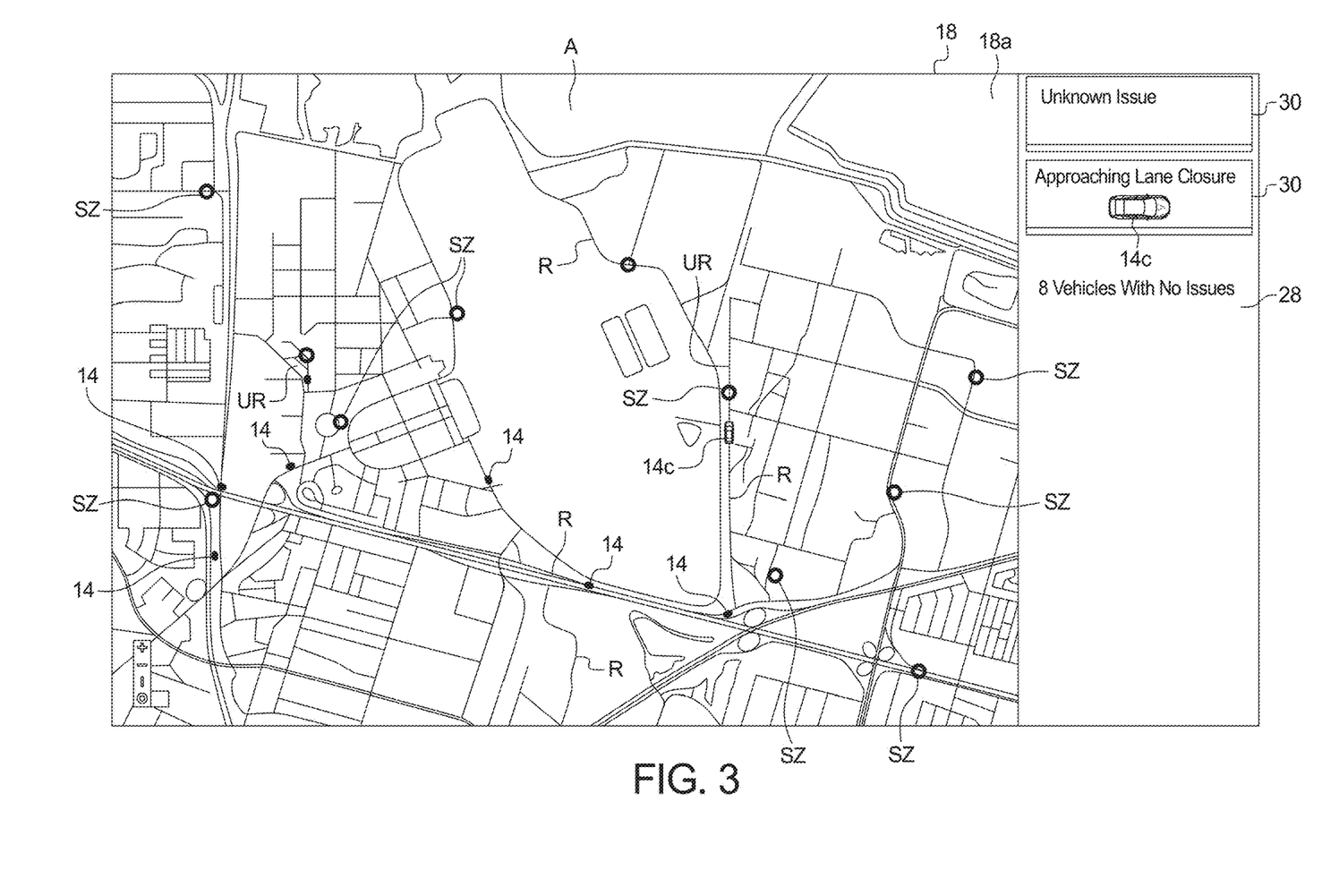
FIG. 3 is a visual display on a terminal of the remote system for an autonomous vehicle showing a map area.

FIG. 3 illustrates an exemplary display on the display device 18. In this example, the display device 18 is displaying a map of an area A including a plurality of autonomous vehicles 14. The map includes roads R and supervision zones SZ. Moreover, the display device 18 can include a vehicle information display area 28. In the vehicle information display area 28, the status of one or a multiple of vehicles 14 can be displayed in a ticket 30 that enables a user or operate to determine the status of an autonomous vehicle 14. In one embodiment, the ticket 30 can be color coded relative to the autonomous vehicle 14. For example, the top ticket 30 can be red, and simultaneously, the autonomous vehicle to which the top ticket 30 pertains is colored red. However, it is noted that the tickets 30 can be linked or identified with a respective autonomous vehicle 14 in any desired manner.

Each autonomous vehicle 14 can have its respective information displayed in a respective ticket 30 or individualized area, so that the operator can determine whether a particular autonomous vehicle needs attention. The remote system for an autonomous vehicle 10 can prioritize the tickets 30 based on the time the autonomous vehicle 14 has been waiting for attention or based on any other criteria.

The ticket 30 can display an issue an autonomous vehicle 14 is having with its particular route. For example, one autonomous vehicle 14c can encounter a super vision zone $SZ_1$ that is for example, a construction that closes a travel lane. In this embodiment, the autonomous vehicle can be labeled 14c on the map and the corresponding ticket can include the vehicle label. In the present situation, the road R can be reduced to one lane, with a signal person (e.g., construction worker CW) indicating when it is appropriate for one vehicle direction to proceed and one vehicle direction to stop, see for example FIG. 4. Moreover, here one vehicle direction is required to cross over a double yellow line or some other road indicator. In such a situation, the autonomous vehicle programming may make it difficult or impossible to proceed without human intervention.

Figure 4:
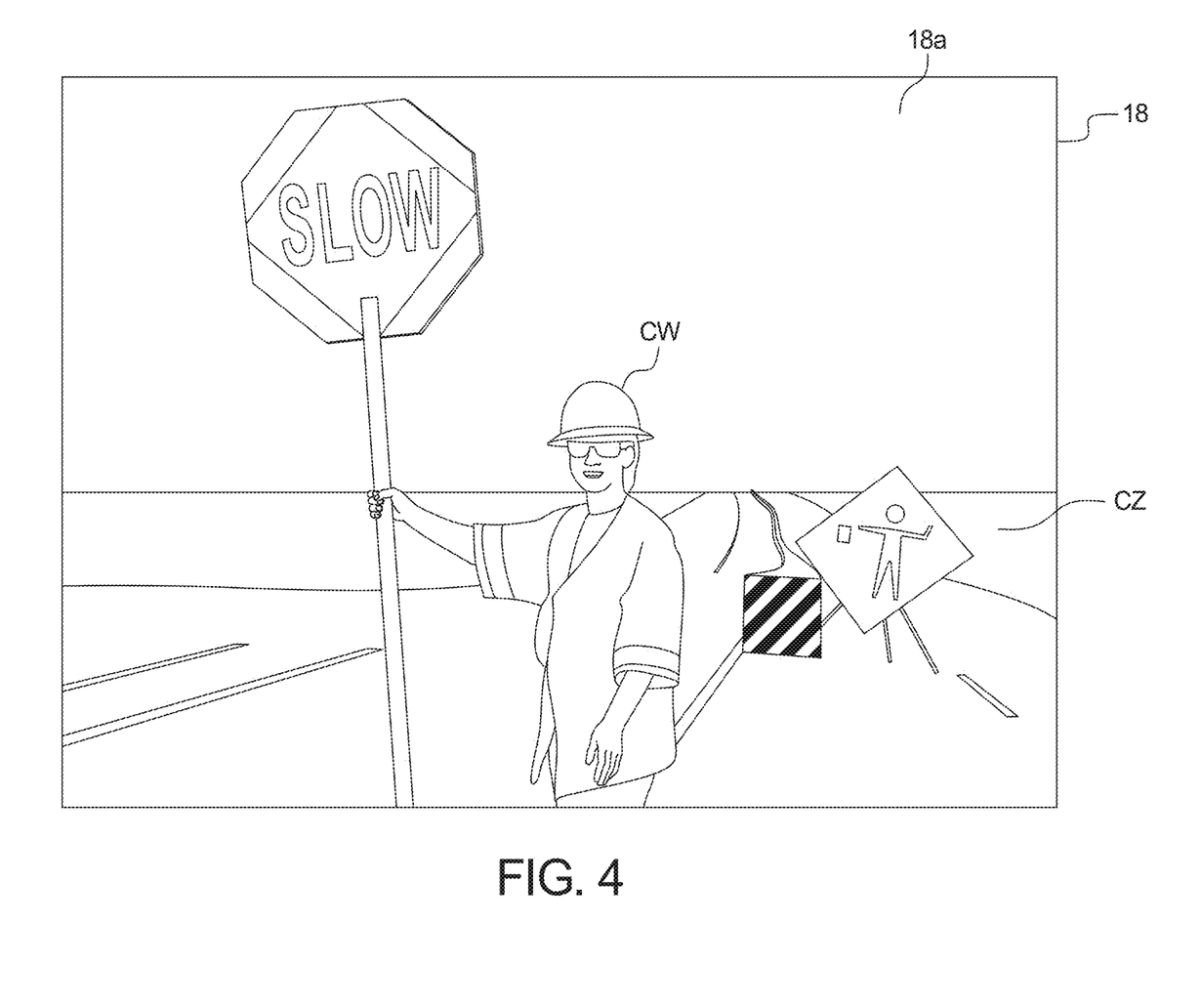
FIG. 4 is a visual display on a terminal of the remote system for an autonomous vehicle showing a view from the autonomous vehicle.

Thus, if an operator is in the vehicle 14c, the operator is capable of overriding the autonomous vehicle 14c programming and enable the autonomous vehicle 14c to proceed. However, if no operator is on board, remote operator intervention may be necessary. In this embodiment, the remote operator can access the autonomous vehicle sensor system to determine the issue the autonomous vehicle. As shown in FIG. 4 for example, the operator can access the autonomous vehicle's camera system to determine that a lane closure has occurred. FIG. 4 illustrates a real time camera view from the autonomous vehicle 14c on the display device 18. That is, the receiver 24 is configured to receive an image transmitted by a camera on the autonomous vehicle 14c, and the display device 18 is configured to display the image.

As shown in FIG. 4, the vehicle 14c is approaching the construction zone CZ in which a construction worker CW is informing the autonomous vehicle 14c to proceed slowly into the oncoming lane. Accordingly, the operator can reroute the autonomous vehicle 14c to an updated route UR (FIG. 3) that enables autonomous vehicle 14c to proceed into the oncoming lane when appropriately indicated by the construction worker CW. The controller 16 is programmed to cause the display device 18 to display the updated route UR (i.e., the route update), as illustrated in FIG. 3. It is noted that the operator instructions do not necessarily override the vehicle's programming regarding system and navigation, the rerouting can merely provide a rerouting of the updated route UR. The updated route UR then travels along the updated route UR after determining there are no other obstacles or oncoming vehicles. However, in some situations the operator can operate or instruct the autonomous vehicle 14c (or any autonomous vehicle 14) to perform acts otherwise contrary to the vehicle's programming.

The supervision zones SZ can be any issue or encounter for an autonomous vehicle that may require operator intervention or attention. That is, the supervision zone can be a variety of road issues that an autonomous vehicle may encounter. For example, as described above, the supervision zone may be a zone created due to construction. Additionally, the supervision zone can be simply a pedestrian issue that causes the autonomous vehicle to have difficulty making a decision, a mapping issue unknown to the autonomous vehicle, or any other situation resulting in the autonomous vehicle waiting a predetermined amount of time or any other issue.

The process of receiving information from an autonomous vehicle 14 and displaying the supervision zone SZ on the display device 18 now be discussed. First, a plurality of autonomous vehicles 14 transmit data. The autonomous vehicles 14 can continually (or at predetermined intervals) transmit data to enable continuous monitoring of the autonomous vehicles 14 by the autonomous vehicle service system 10. That is, the autonomous vehicles 14 can transmit data that is displayed on the display device 18 that enables an operator to continually monitor the vehicles speed, direction and location. The vehicle information can also include additional data, including but not limited to vehicle destination, vehicle occupancy or any other suitable information.

Figure 5A:
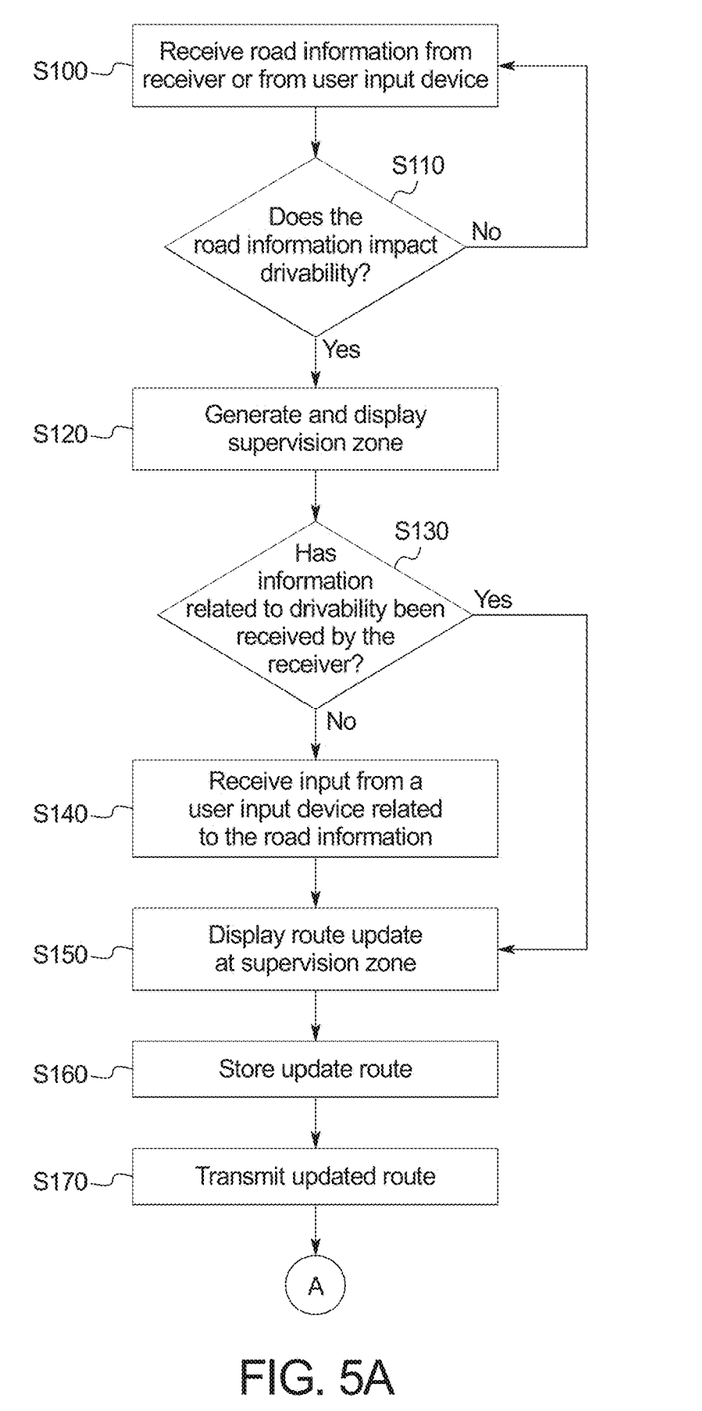
FIGS. 5A and 5B are flow charts illustrating the procedure foe creating a supervision zone when the road information impacts road drivability at the remote system for an autonomous vehicle.
Figure 5B:
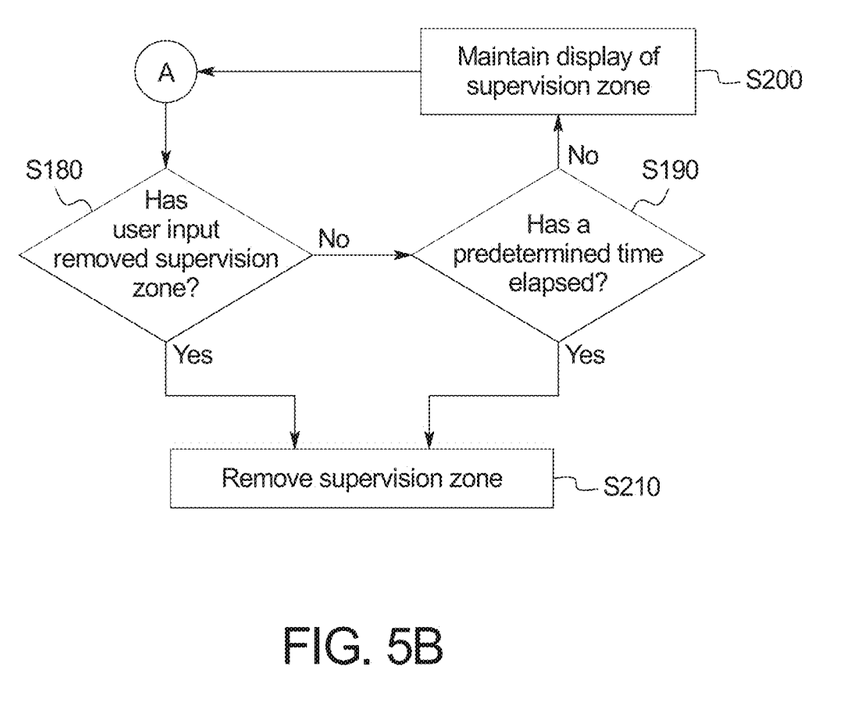

In one embodiment, as shown in FIGS. 5A and 5B, the transmitted vehicle information can include road information as illustrated in step S100. The information received by the controller 16 can be an input directly from the receiver 24 or from the user input device. The controller 16 receives the input related to the road information and determines whether the information impacts the drivability of the autonomous vehicle 14 in step S110. Alternatively, the user can determine whether the information impacts the drivability of the autonomous vehicle 14. If the information does not impact drivability, the remote system 10 continues to receive and monitor the transmitted vehicle information. When it is determined (by the controller 16 or the user) that the information does impact drivability, the controller 16 generates and displays a supervision zone SZ on the display device 18 in step S120. In step S130, the controller 16 determines whether information related to the drivability for this supervision zone SZ has been received. For example, another autonomous vehicle 14 can have approached this supervision zone SZ and have had the issue resolved. In such a situation, the controller 16 will update the display indicating a resolution is known for this supervision zone SZ. If information related to the drivability for this supervision zone SZ has not been received, the remote system 10 will maintain a ticket 30 for the autonomous vehicle 14 encountering this supervision zone SZ in the display area 28. The remote system 10 will then require input to be received from a user input device 20 related to the road information in step S140. In other words, the operator can input a resolution to the supervision zone SZ. For example, as discussed above, the operator can reroute the autonomous vehicle 14c to an updated route UR (FIG. 3) that enables the autonomous vehicle 14c to proceed into the oncoming lane when appropriately indicated by the construction worker CW.

The updated route UR is then displayed at the supervision zone SZ on the map in step S150. Thus, the operator can monitor and view all supervision zones SZ and any resolutions to the supervision zones SZ. If desired, the operator can establish resolutions to the supervision zones SZ at any time and an autonomous vehicle 14 encountering an issue is not required. That is, if a supervision zone SZ exists without an autonomous vehicle 14 encountering the supervision zone SZ, the operator can identify the supervision zone SZ on the map and input a resolution (e.g., a updated route UR).

The updated route UR is then stored in the storage device 22 in step S160 and transmitted via the transmitter 26 to the autonomous vehicle 14 in step S170. Through time, the supervision zone SZ may be removed. That is, as the information from the autonomous vehicles 14 is monitored, or through some other means, the operator may determine that the there is no longer an issue on the road at the supervision zone SZ. Thus, in such a situation the controller 16 determines whether the supervision zone SZ has been removed in step S180. If the supervision zone SZ has not been removed by user input, the controller 16 determines whether a predetermined time has elapsed in step S190. In other words, in some supervision zone SZ situations, a predetermined time can be set for the supervision zone SZ to be removed. The operator may be aware of specific instances in which the issue causing the supervision zone SZ will be resolved and the supervision zone SZ is no longer necessary. However, it is possible that a situation can exists in with the predetermined time is indefinite, and thus the supervision zone SZ is not capable of being removed due to a predetermined time. If the predetermined time has not elapsed, the controller 16 maintains the display of the supervision zone SZ in step S200. When the predetermined time has elapsed, the controller 16 can automatically remove the supervision zone SZ from the display in step S210.

Returning to step S180, when the operator has removed the supervision zone SZ by user input, the controller 16 can remove the supervision zone SZ from the display in step S210. In either situation, once the supervision zone SZ has been removed, the controller 16 can update the autonomous vehicles 14 by transmitting removal of the supervision zone SZ and the removal of the updated route via the transmitter 26.

It is noted that, rather than timed resolution or user resolution, the supervision zone SZ can be removed when an autonomous vehicle 14 is able to drive through the supervision zone, since the issue causing the supervision zone SZ has been resolved.

Moreover, if the user knows (or the controller determines) that the supervision zone SZ is going to be resolved temporarily, the supervision zone SZ can be marked an inactive. In such a situation, the supervision zone SZ is not removed entirely, but only temporarily, allowing autonomous vehicles 14 to pass through the supervision zone SZ without an updated route UR. After a predetermined time or based on user input or determination by the controller 16, the supervision zone SZ can be reactivated and the updated route UR can be reactivated.

The display device 18, input device 20, storage device 22, receiver 24 and transmitter 26 are conventional components that are well known in the art. Since the display device 18, input device 20, storage device 22, receiver 24 and transmitter 26 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a vehicle equipped with the autonomous vehicle service system.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A remote system for an autonomous vehicle, comprising:
    a non-moveable receiver disposed in a remote location relative to the autonomous vehicle and configured to receive road information;
    a controller programmed to receive the road information from the non-moveable receiver and create a supervision zone when the road information impacts road drivability, receive information from an input to generate a route to avoid the supervision zone, and determine whether the supervision zone has been removed;
    a transmitter configured to transmit data to the autonomous vehicle;

a display device disposed at a predetermined control center area remote from the supervision zone and configured to display a visual indication on a map of the supervision zone; and when the controller has determined that the route has been generated to resolve the supervision zone, the controller is configured to combine the road information and the information from the input to automatically update the display indicating the route to avoid the supervision zone and configured to cause a first set of data of the data to be automatically transmitted, via the transmitter, to update the autonomous vehicle of the route to avoid the supervision zone, when the controller has determined that the supervision has been removed, the controller is configured to update the display indicating the removal of the supervision zone and configured to cause a second set of data of the data to be automatically transmitted, via the transmitter, to automatically update the autonomous vehicle, via the transmitter of the removal of the supervision zone.

2. The remote system of claim 1, wherein
the controller is programmed to determine whether the road information impacts road drivability.

3. The remote system of claim 1, wherein
the input is received by the controller from a user input.

4. The remote system of claim 1, wherein
the controller is programmed to remove the visual indication of the supervision zone after a predetermined amount of time.

5. The remote system of claim 1, wherein
the input is disposed at the predetermined control center area remote from the supervision zone.

6. The remote system of claim 1, wherein
the receiver is configured to receive a signal from an emergency vehicle, and the controller is programmed to determine that the signal is road information that impacts road drivability.

7. The remote system of claim 1, further comprising
a storage device configured to store the route to avoid the supervision zone.

8. The system of claim 1, wherein
the receiver is configured to receive vehicle information, and
the controller is programmed to determine that the vehicle information is road information that impacts road drivability.

9. The system of claim 1, wherein
the receiver is configured to receive an image transmitted by a vehicle camera, and the display device is configured to display the image.

* * * * *